US008347632B2

(12) United States Patent
Hoffmann

(10) Patent No.: US 8,347,632 B2

(45) Date of Patent: Jan. 8, 2013

(54) OPEN-COOLED COMPONENT FOR A GAS TURBINE, COMBUSTION CHAMBER, AND GAS TURBINE

(75) Inventor: Stefan Hoffmann, Rosenthal (DE)

(73) Assignee: Siemens Aktiengesellschaft, München (DE)

( * ) Notice: Subject to any disclaimer, the term of this patent is extended or adjusted under 35 U.S.C. 154(b) by 620 days.

(21) Appl. No.: 12/631,940

(22) Filed: Dec. 7, 2009

(65) Prior Publication Data

US 2010/0083665 A1 Apr. 8, 2010

Related U.S. Application Data

(62) Division of application No. 10/561,641, filed as application No. PCT/EP2004/006491 on Jun. 16, 2004.

(30) Foreign Application Priority Data

Jul. 4, 2003 (EP) .................................... 03015216

(51) Int. Cl.
*F02C 1/00* (2006.01)

(52) U.S. Cl. ........................................................ 60/752

(58) Field of Classification Search ............. 60/752–760
See application file for complete search history.

(56) References Cited

U.S. PATENT DOCUMENTS

| | | | | |
|---|---|---|---|---|
| 2,647,368 | A | 8/1953 | Triebbnigg et al. | |
| 2,981,066 | A | 4/1956 | Johnson | |
| 3,037,351 | A | 6/1962 | Stoltz | |
| 4,302,940 | A * | 12/1981 | Meginnis | 60/754 |
| 4,315,406 | A * | 2/1982 | Bhangu et al. | 60/754 |
| 4,347,037 | A | 8/1982 | Corrigan | |
| 4,928,481 | A | 5/1990 | Joshi et al. | |
| 5,125,793 | A | 6/1992 | MacArthur et al. | |
| 5,405,242 | A | 4/1995 | Auxier et al. | |
| 6,192,688 | B1 | 2/2001 | Beebe | |
| 6,582,194 | B1 | 6/2003 | Birkner et al. | |
| 2003/0024234 | A1 | 2/2003 | Holm et al. | |
| 2006/0171809 | A1 | 8/2006 | Albrecht et al. | |

FOREIGN PATENT DOCUMENTS

| | | | |
|---|---|---|---|
| EP | 0 641 917 | A1 | 3/1995 |
| GB | 2 310 896 | A | 9/1997 |
| WO | WO9911420 | A1 | 3/1999 |

* cited by examiner

*Primary Examiner* — Phutthiwat Wongwian

(57) ABSTRACT

An open-cooled component for a gas turbine is provided. The component includes an outer wall that is subjected to a hot gas and at least partially defines a first cavity for a first means. The outer wall is provided with through-openings which open up into the cavity on one side and into a hot gas chamber on the other. The inventive component also includes at least one second cavity for admixing a second means, said second cavity is connected to the through-openings in a fluid-connected manner. A combustion chamber for a gas turbine, and to a gas turbine including one such component is also provided.

1 Claim, 2 Drawing Sheets

OPEN-COOLED COMPONENT FOR A GAS TURBINE, COMBUSTION CHAMBER, AND GAS TURBINE

CROSS REFERENCE TO RELATED APPLICATION

This application is a divisional of U.S. Ser. No. 10/561,641 filed on Dec. 20, 2005. This application is the US National Stage of International Application No. PCT/EP2004/006491, filed Jun. 16, 2004 and claims the benefit thereof. The International Application claims the benefits of European Patent application No. 03015216.9 EP filed Jul. 4, 2003. All of the applications are incorporated by reference herein in their entirety.

FIELD OF THE INVENTION

The present invention relates to an open-cooled component for a gas turbine having an outer wall which is subjected to hot gas and which at least partly defines a first cavity for a first medium and in which through-openings are arranged, which through-openings open into the cavity on the one side and into the hot-gas space on the other side, and having at least one second cavity for admixing a second medium, this second cavity being fluidically connected to the through-openings. The invention further relates to a combustion chamber and a gas turbine.

BACKGROUND OF THE INVENTION

Combustion chamber walls and also gas turbine blades are subjected to high physical stress during operation of the gas turbine in accordance with the intended purpose. In order to make the combustion chamber and the blade more resistant to the high stress, these components are provided with cooling. If air is used as cooling medium, it is extracted from a compressor connected upstream of the combustion chamber and having a diffuser and is lost in the combustion process. Flame temperatures and NOX emissions consequently increase.

The wall of a combustion chamber is cooled in either an open or closed manner. The open cooling is in this case designed as convective cooling, film cooling or also as impingement cooling with a discharge of cooling air into the combustion space. The closed cooling requires greater design outlay and leads to an increased pressure loss on account of the cooling air conduction and the cooling itself.

In order to reduce the adverse effect caused by the extraction of cooling air, it is known to add fuel. In the prior art, this is known as cooling-air reheating or in a further sense also as progressive combustion.

To this end, U.S. Pat. No. 5,125,793 shows a turbine blade of a gas turbine having a double outer wall enclosing a cavity. A flow passage for air is arranged in the double outer wall. Flowing in the cavity is a liquid fuel which is sprayed through through-openings into the flow passage located in the double wall and which strikes a catalyst there. Due to the catalyst, the fuel decomposes endothermically into at least one combustible gas, a factor which cools the blade. The air transports the gases to an outlet, from which the mixture can flow into the turbine and burn there.

Furthermore, U.S. Pat. No. 6,192,688 discloses a combustion chamber of a gas turbine having a plurality of hollow fixed spokes, in the cavity of which a fuel is directed. The cavity is connected to the combustion space by openings. In a supply passage arranged in the outer wall of the spokes, air is additionally directed to the openings in order to obtain a combustible mixture in combination with the fuel, this combustible mixture being fed into the combustion chamber for $NO_X$ reduction during operation of the gas turbine.

In addition, U.S. Pat. No. 4,347,037 discloses a hollow turbine blade in which uniformly distributed film-cooling openings are incorporated in the side walls around which hot gas can flow. A respective outlet passage is provided for each film-cooling opening. Opening out at their inlets lying in the blade wall are in each case two separate feed passages starting at the inner cavity of the turbine blade in order to be able to direct the cooling air required for the film cooling from the cavity to the film-cooling opening.

A disadvantage with the known concepts is that, to mix cooling air and fuel, a volume has to be provided in which the reaction partners can ignite by spontaneous ignition or flashback in the components. In this way, stable combustion processes possibly form, so that the cooling effect of the fuel/air mixture is lost or the component may be damaged by the internally occurring combustion.

SUMMARY OF THE INVENTION

It is therefore the object of the present invention to specify a component for a gas turbine, a combustion chamber and a gas turbine, with which the disadvantages described above can be reduced.

This object is achieved by the features of the claims. Advantageous configurations are specified in the subclaims.

The solution provides for cooling medium and fuel to be directed separately in separate passages. These two media are therefore not mixed to form a combustible mixture until just before the discharge into the hot gas. The combustible mixture is therefore prevented from igniting in the components themselves, that is to say outside the flow duct and/or outside the combustion chamber, by flashback or spontaneous ignition.

This is achieved by the second cavity being formed by supply passages which are provided in the outer wall and are connected via transverse passages to the through-openings designed as through-bores, so that the two media cannot be mixed until inside the through-bores.

Furthermore, the invention proposes a combustion chamber for a gas turbine having a wall element which has a corresponding arrangement.

The invention turns away from the double-walled embodiment known from the prior art. As a result, the second cavity formed hitherto between the double wall can be embedded in the outer wall as a supply passage which is connected to the through-openings via separate transverse passages. In this way, a means of avoiding a mixing volume in the component is thus essentially completely avoided for the first time, as a result of which flashback and spontaneous ignition in the component can be largely avoided. Furthermore, with a component designed as a wall element of a combustion chamber, a flame temperature increase in open cooling can be reduced, since the cooling air can now be enriched with fuel without the disadvantages described above. The present invention therefore enables the cooling-air flow to be increased without adverse effects on the combustion.

Furthermore, the present invention enables the flame acoustics to be influenced, in particular detuned. For example, the through-opening can be provided so that the cooling air flows into the combustion space of the combustion chamber. Fuel can be fed via the supply passage provided in the outer wall of the component, this fuel mixing with the cooling air when flowing into the through-opening and thus forming a combustible mixture. A flashback is avoided inasmuch as there is no ignitable mixture in one of the supply passages or in the cavities upstream of the outlet of the transverse passage in the through-opening. The undesirable, partly dangerous states mentioned above can therefore be avoided.

In a further configuration, it is proposed that the outer wall have a multiplicity of through-bores, a multiplicity of supply passages running between the bores and a multiplicity of further transverse passages linking the supply passages with the through-bores. The mixture of fuel and cooling air flowing into the combustion chamber can be made more uniform due to the netlike structure of the passages and bores. In addition, it is possible to cool the component more uniformly, so that local overheating can be avoided.

In addition, it is proposed that the outer wall have at least two layers which can be connected to one another. Thus, for example, one layer can have the passage, while a second layer is formed on the combustion-chamber side from an especially resistant material. A high loading capacity of the component can be achieved.

Furthermore, it is proposed that the passage be incorporated on the connection side in at least one layer surface of one of the layers. In this way, the passage can be incorporated in the surface of a layer by milling or similar material-removing processes, closed passages being formed by putting together the adjacent layers. As a result, the passage can be incorporated in the component by means of known and also cost-effective processes.

In a further advantageous configuration, it is proposed that the cavity be capable of being connected to a first fluid source and that the supply passage be capable of being connected to a second fluid source. Both fluids, i.e. media, may be used for cooling the blade in such a way that the air quantity required for the cooling is reduced. A greater air quantity is available to the combustion process, so that high flame temperatures and $NO_X$ emissions can be reduced. The blade is basically based on the same principle as for the wall element of the combustion chamber. Here, too, there is essentially no mixing volume, so that flashback and spontaneous ignition are largely avoided. The reliability of the gas turbine with regard to defective blades can be increased. As in the case of the combustion chamber, the cooling-air flow can also be increased without adverse effects on the combustion, and the flame acoustics can also be detuned.

Furthermore, it is proposed with the invention that one of the two fluid sources be an oxidation source and the other fluid source be a fuel source. The effect can be advantageously achieved that an ignitable mixture cannot be produced until in the region of the outlet of the through-opening into the flow duct of the gas turbine if the outlet of the passages is arranged sufficiently close to the outlet of the through-opening in the flow duct.

The invention also proposes a gas turbine, the gas turbine having a combustion chamber according to the invention. The adverse effects as described above can be largely reduced by feeding fuel, the combustion chamber permitting a reliable operation with regard to spontaneous ignition and flashback. Furthermore, the flame acoustics can also be advantageously influenced in order to reduce stresses and wear caused by this.

In addition, the invention proposes a gas turbine having a component designed as a blade. The cooling effect for the blade of the turbine unit, which may be designed as a fixed guide blade and also as a rotating moving blade, can be improved by increasing the cooling-air flow, in which case the adverse effects on the combustion can be largely avoided. This configuration according to the invention can also exert an influence on the detuning of the flame acoustics. Wear phenomena can be further reduced.

BRIEF DESCRIPTION OF THE DRAWINGS

Further advantages and features can be gathered from the description below of the exemplary embodiments. Components which are essentially the same are designated with the same reference numerals. Furthermore, with regard to identical features and functions, reference is made to the description with respect to the exemplary embodiment in FIG. 1.

In the drawing.

DETAILED DESCRIPTION OF THE INVENTION

Figure 1:
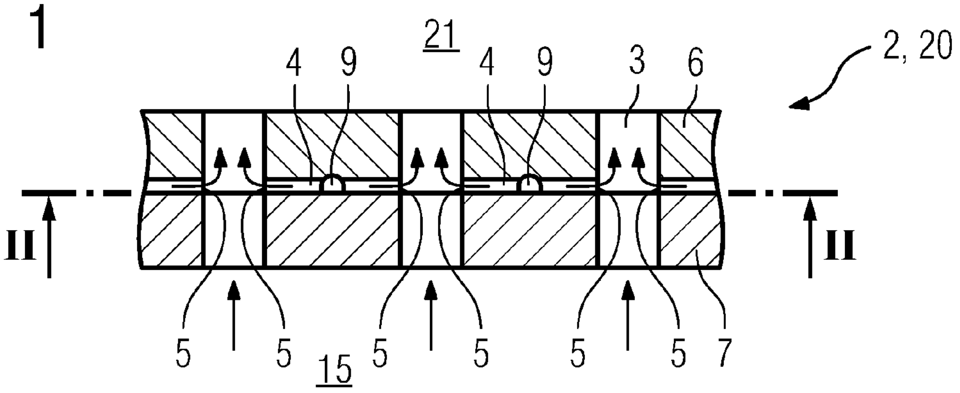
FIG. 1 shows a section through a wall element according to the invention for a combustion chamber.
Figure 2:
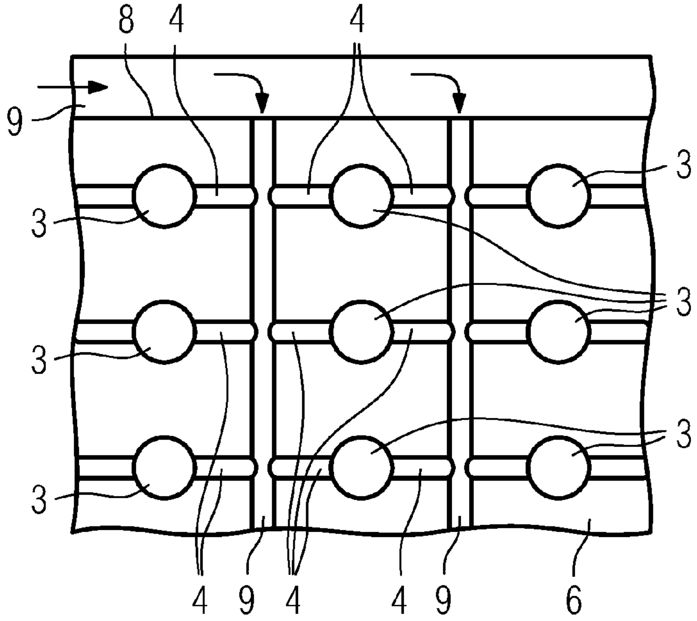
FIG. 2 shows a section through the wall element in FIG. 1 along line I-I.

FIG. 1 shows a section through a component designed according to the invention as a wall element 2 and having a multiplicity of through-openings 3 through which cooling air can enter the combustion chamber. Furthermore, the wall element 2 has transverse passages 4 which open with one end in each case into a through-opening 3. A fluid fuel can be fed via connecting passages 9, this fluid fuel being passed via the transverse passages 4 to the through-openings 3 and being directed there into the flow of the cooling air. FIG. 2 illustrates this system of passages for the fuel feed. The wall element 2 has two layers 6, 7 which can be connected to one another. The passage system is incorporated in the connection-side layer surface of the layer 6 by milling. Closed passages 4 and 9 are formed by the connection of the layers 6 and 7.

Figure 3:
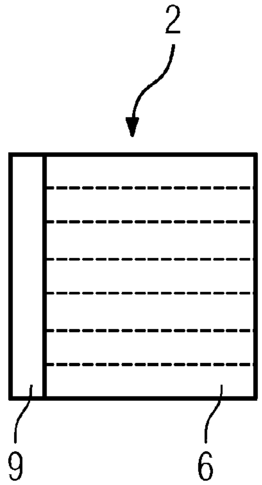
FIG. 3 shows a schematic illustration of a system of passages in a wall element according to the present invention.

FIG. 3 shows a plan view of the surface of the layer 6 of the wall element 2 in which the passages 4 and 9 are incorporated. The connecting passage 9 is formed in one piece with the wall element.

In the present configuration, the combustion chamber is composed of a multiplicity of wall elements 2 in a modular manner. The wall element 2 may also be advantageously used as a heat shield, liner and the like.

Figure 4:
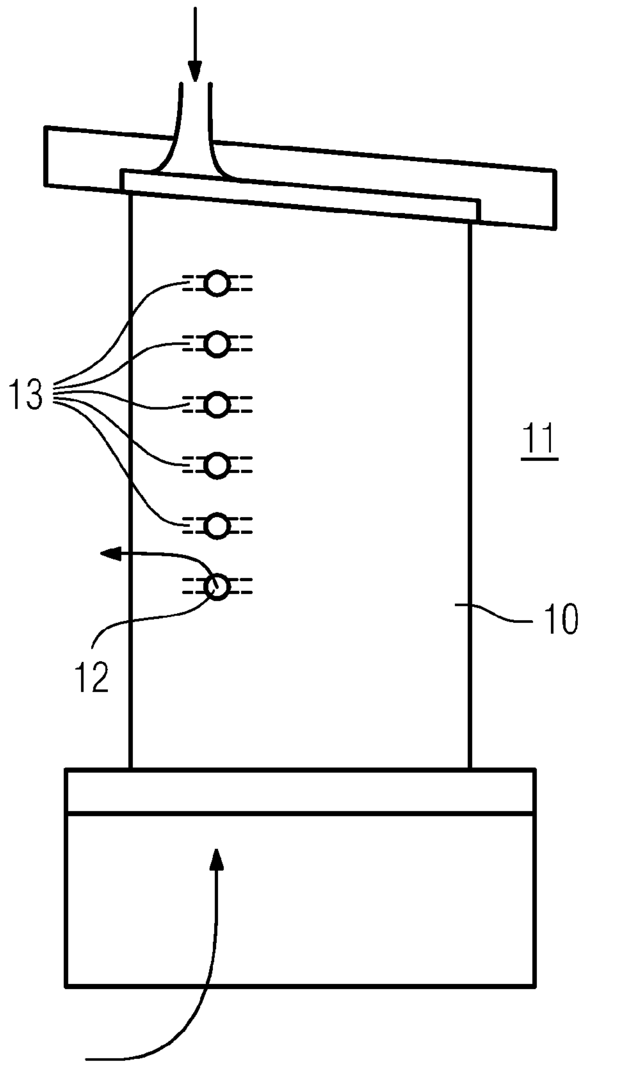
FIG. 4 shows a schematic illustration of a blade in a flow duct of a gas turbine.

A detail of a flow duct of a gas turbine is schematically shown in FIG. 4, a blade 10 being arranged in this flow duct. Through-openings 12 open into the hot-gas space 21 designed as flow duct 11, the points at which transverse passages 13 lead in being schematically indicated in the outlet region of said through-openings 12.

Figure 5:
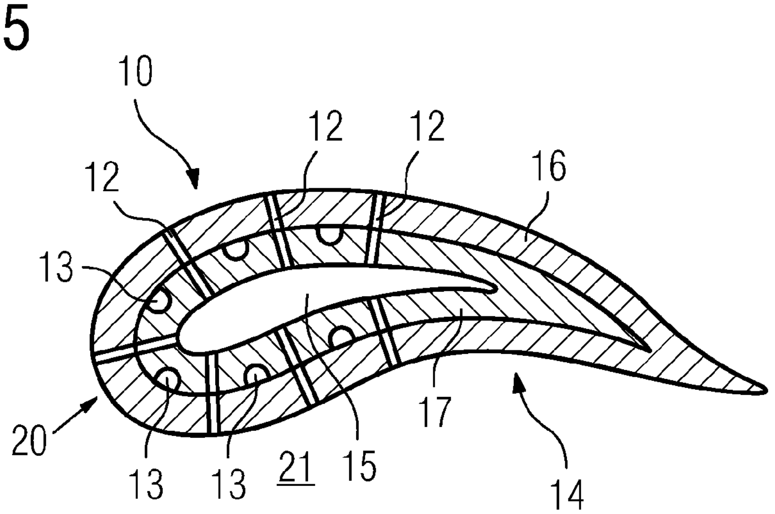
FIG. 5 shows a section through a blade according to the invention.

FIG. 5 shows a section through such a blade 10. In this configuration, the blade wall 14 encloses a cavity 15, the blade wall 17 being provided with through-openings 12. Cooling air can be fed via the cavity 15, this cooling air discharging into the flow duct 11 through the through-openings 12. Furthermore, the blade wall 14 is provided with a system of supply passages 13 which are connected in each case to the through-openings 12 via transverse passages 4. The supply passages 13 are fluidically connected to a fluid fuel source. In this configuration, the blade 14 is of two-layer construction, consisting of an outer layer 16 and of an inner layer 17 forming the cavity 15. On its side facing the layer 16, the inner layer 17 has recesses which are incorporated by milling and form the passage system having the supply passages 13.

According to the invention, cooling air for the blade 10 is directed as oxidation medium into the flow duct 11 via through-openings 12. At the point at which the transverse passage 4 leads in, the fluid fuel is directed into the through-openings 12 of the blade wall 14, so that an ignitable mixture is produced.

With regard to the wall element 2 of the combustion chamber, air is directed as cooling medium and oxidation medium into the combustion chamber through the through-opening 3 of the wall element 2. At the same time, a fluid fuel is directed into the cooling-air flow in the region of the passage outlet 5 of the transverse passage 4, so that an ignitable mixture is likewise produced.

It follows from what is mentioned here that the ignitable mixture is not produced until in the region of the outlet of the through-openings 3, 12 into the combustion chamber and the flow duct 11, respectively, of the gas turbine. In this way, flashback into the respective passage system with the damage caused by this is prevented. In addition, the flame acoustics can be influenced by specific variation of the fuel feed. This likewise has an advantageous effect on the wear and the reliability of the gas turbine.

The exemplary embodiments shown in the figures merely serve to explain the invention and do not restrict it. Thus, the number and arrangement of the passages and through-openings and also the production methods may be varied without departing from the scope of protection of the invention. The use of fluids other than air, such as, for example, nitrogen, carbon dioxide or other liquid substances, may also be provided within the scope of the invention. In particular, a combination of an already existing system with the present invention is also included.

The invention claimed is:

1. A combustion chamber for a gas turbine, comprising:

a plurality of wall elements, that form a combustion chamber, each element having:

an outer wall exposed to a hot gas;

a first cavity partly defined by the outer wall and for a first medium;

a plurality of through-openings arranged in the outer wall where the through-openings open into the first cavity on a first side and into a hot-gas space on a second side; and a second cavity for admixing a second medium, the second cavity being fluidically connected to the through-openings, wherein the second cavity is formed by supply passages provided in the outer wall and connected via transverse passages to the through-openings designed as through-bores, so that the two media cannot be mixed until inside the through-bores.

* * * * *